Aug. 2, 1960  B. W. SZNYCER  2,947,497

DUAL ENGINE DRIVE MEANS FOR HELICOPTERS

Filed May 6, 1957

INVENTOR.
BERNARD W. SZNYCER
BY
ATTYS.

United States Patent Office 2,947,497
Patented Aug. 2, 1960

2,947,497
DUAL ENGINE DRIVE MEANS FOR HELICOPTERS

Bernard W. Sznycer, New York, N.Y., assignor to Omega Aircraft Corporation, New York, N.Y., a corporation of New York Filed May 6, 1957, Ser. No. 657,336
4 Claims. (Cl. 244—17.11)

The principal object of the present invention is to provide in a single rotor helicopter of light weight, compact design, a twin-engine drive having unique efficiency and safety in operation.

According to the invention, means are provided whereby two engines are mounted close to the rotor shaft at either side thereof in a position where the motors counterbalance each other and the weight of the forward cabin with pilot. In the transmission is included means whereby either motor automatically disconnects if it fails or lags behind the other, so that the machine may continue in flight powered by only one engine.

The desirability from the standpoint of safety of having a twin engine drive in a light-weight, small size helicopter has frequently been recognized but never reduced to a practical embodiment because of the vibration problems involved in connecting two piston engines to a single gear box. Normally the torsional vibrations of the crankshaft produce deflections through the drive system. With two engines, these deflections are accentuated because of the opposing firing impulses. Any amplification, due to an undetected engine malfunction or the like, could result in a resonant condition and fatigue failure.

According to the invention, this problem is overcome by a plurality of means, such as by locating the engines with their crankshafts in non-parallel relationship and by introducing flexible couplings and belt drives in the connections between the engines and rotor gear box.

A further important advantage of the invention resides in the location of two air-cooled engines closely adjacent, and to either side of, the main rotor gear to which each engine is coupled, in such manner that the cooling fans of each engine draw cooling air across the entire transmission system including the rotor gear and the interposed belt drives. This effect is substantially accentuated by canting each engine toward the aft of the fuselage, so that the cooling fan of each engine is partially facing into the air stream which will normally pass from fore to aft of the helicopter when in forward flight.

This application is one of several relating to a helicopter of my invention, other copending applications being my Serial No. 473,094, filed December 6, 1954, now Patent No. 2,884,273, Serial No. 656,902, filed May 3, 1957, Serial No. 656,903, filed May 3, 1957, Serial No. 666,024, filed June 17, 1957, Serial No. 665,973, filed June 17, 1957, and Serial No. 695,354, filed November 8, 1957.

Other features and advantages will be noted in connection with a description of the drawing, wherein:

Fig. 2 is a schematic diagram in elevation showing the drive connections for one of a pair of engines the drive for the opposite engine being similar;

Figure 4:
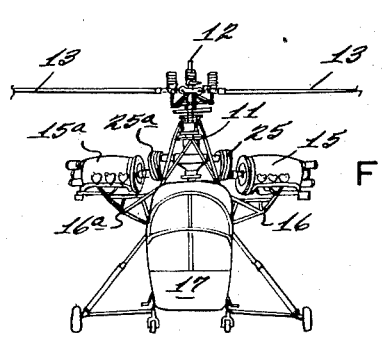

In these views the welded tubular frame of a helicopter constructed according to my invention is shown at 10. A central pylon 11, erected on frame 10 (see Fig. 4), supports the shaft of a rotor 12 having blades 13. Rotor shaft 12 at its lower end terminates in a gear box and carries a spiral bevel gear 14.

Figure 1:
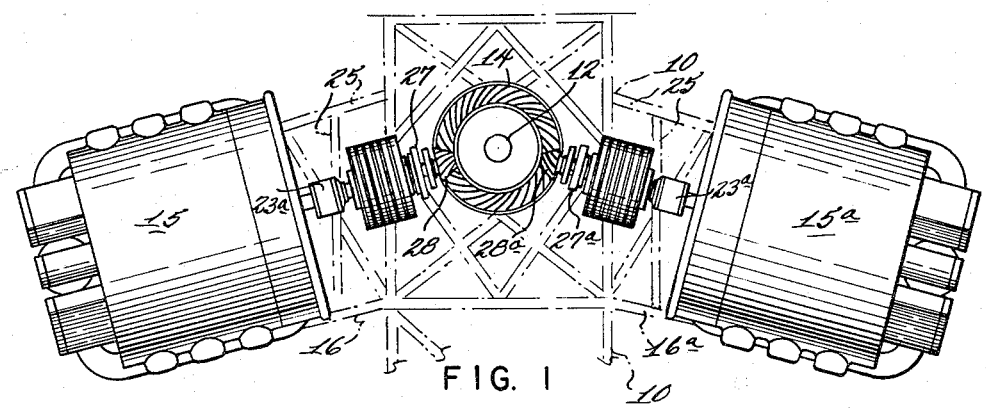
Fig. 1 is a top plan view with the central shaft connection in section, and parts of the fuselage of a helicopter shown in dotted lines.
Figure 3:
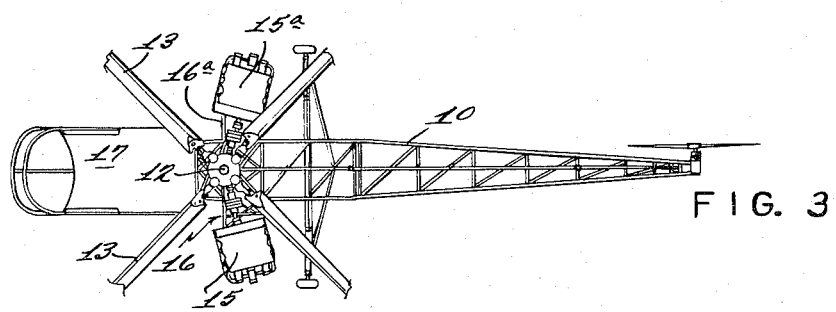
Figs. 3 and 4 are top and front views respectively of a helicopter having a dual engine installation according to the invention.

In the example given, motors 15 and 15a are shown as air-cooled engines of approximately 200 H.P. each. These are mounted on outrigger extensions 16—16a of the fuselage 10 on opposite sides of rotor shaft 12, equidistantly therefrom, but canted aft about 15 degrees as best seen in Figs. 1 and 3. This disposition tends to counterbalance the weight of cabin 17 including weight of the pilot and vice versa, and also assists in solving the vibration problem which would arise if the motor shafts were in parallel, as noted above. Outriggers 16—16a also carry the motors so that the shafts thereof extend inwardly on a plane lower than that of gear 14, so that the belt drives described below may be included in the transmission.

Figure 2:
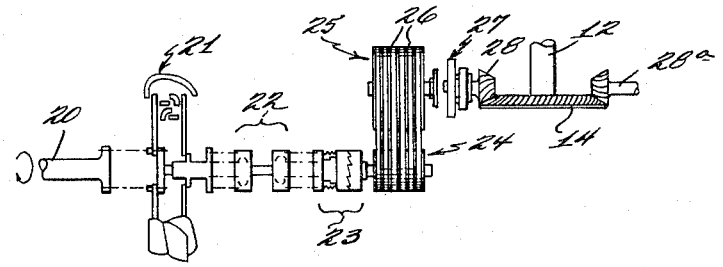

In Fig. 2, the drive connections for motor 15 are shown diagrammatically, it being understood that the drive of motor 15a is the same, but opposite.

Engine crankshaft 20 carries a centrifugal clutch and engine fan indicated at 21. A constant velocity universal joint or other suitable flexible connection is shown at 22. This is in turn connected to a ratchet-jawed clutch 23 which is spring urged to the closed position as shown. The centrifugal clutch functions in known manner, being adjustable so that the rotor blades are actuated slowly and at preselected motor r.p.m., thus avoiding sudden stresses imparted to the rotor blades during acceleration. Flexible connection 22 avoids the need for precise alignment of motor shaft 20 with pulley 24 and aids in reducing vibration in the transmission.

The jaws of clutch 23 disengage upon failure of motor 15, thus removing any substantial drag on rotor shaft 12 which may then continue to be driven by motor 15a.

A belt transmission composed of a small diameter pulley 24, a larger diameter pulley 25, and connecting belts 26 is next connected to driven side of clutch 23. The shaft of pulley 25 is fixedly mounted, by means not shown (such as extensions of the pylon or fuselage), in the plane of gear 14, and the transmission completed through a flexible coupling 27 and a spiral bevel pinion 28. Some of these parts may be seen in Fig. 1. In Fig. 1, parts corresponding to the above connected to motor 15a carry the same numerals with an "a" designator.

What is claimed is:

1. In a helicopter, a fuselage frame, a single rotor shaft mounted thereon carrying rotor blades, a main rotor gear carried by said rotor shaft, a pair of air-cooled engines carried by said fuselage frame substantially equidistantly at either side of said fuselage frame and closely adjacent said main rotor gear, said engines each having fan means to draw an air stream from the direction of said main rotor gear, and across said engines, transmission means connecting each engine with said rotor gear, said means each being located substantially in the path of the aforesaid air stream flowing to each engine, pulley means connected by a belt drive being included in each said transmission means.

2. The invention according to claim 1, wherein the fan means of each engine is located on the side of the engine adjacent said main rotor gear.

3. The invention according to claim 1, wherein the engines are canted to the aft of the fuselage structure, thereby increasing the exposure of said fan means to the flow of air caused by flight of the helicopter.

4. In a helicopter, a fuselage frame, a single rotor shaft mounted thereon carrying rotor blades, a main rotor gear carried by said rotor shaft, a pair of engines carried by said fuselage frame substantially equidistantly at either side of said fuselage frame and closely adjacent said main rotor gear, said engines each having fan means drawing an air stream from the direction of said main rotor gear, transmission means connecting each engine with said rotor gear, each of said transmission means including flexible, vibration-damping coupling means, said coupling means being disposed between said rotor gear and said fan means in the path of said air stream.

References Cited in the file of this patent

UNITED STATES PATENTS

| | | |
|---|---|---|
| 1,408,899 | Marple | Mar. 7, 1922 |
| 2,318,259 | Sikorsky | May 4, 1943 |
| 2,755,038 | Gluhareff | July 17, 1956 |